Jan. 12, 1943. D. G. FAWKES 2,308,475
SPRING LOADED STUFFING BOX
Filed Aug. 7, 1941 2 Sheets-Sheet 1
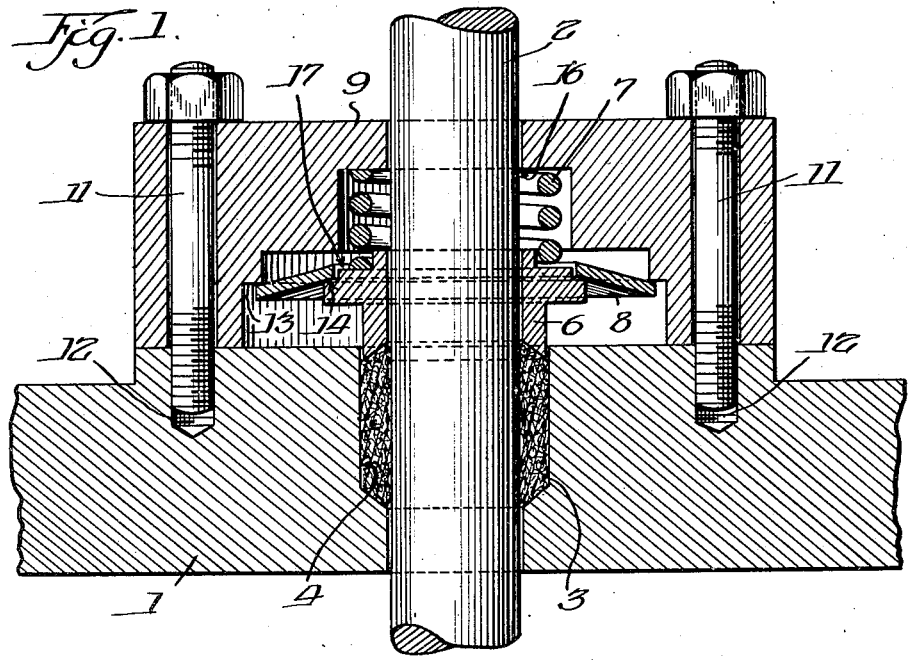
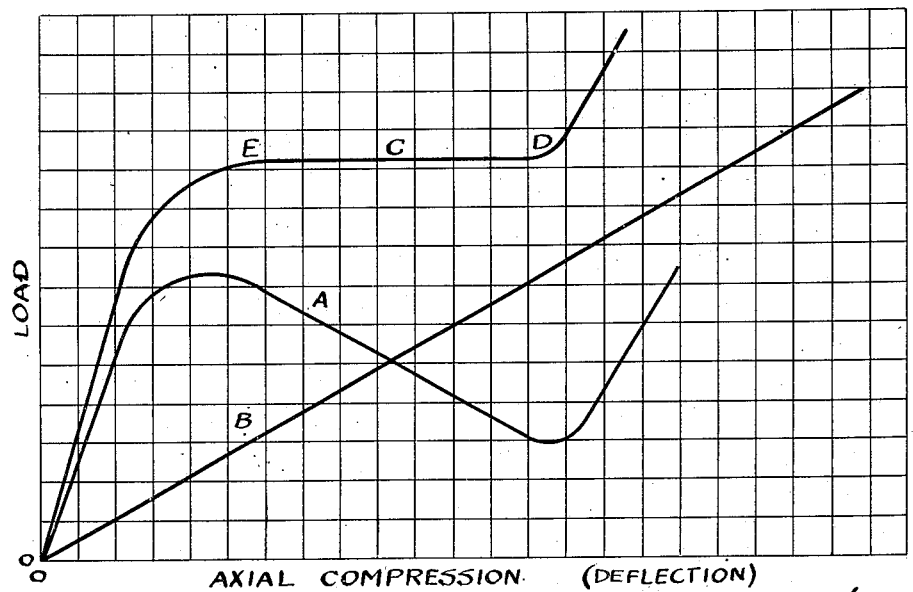
Inventor:
Donald G. Fawkes:
By Joseph O. Lange Atty.

Jan. 12, 1943.  D. G. FAWKES  2,308,475
SPRING LOADED STUFFING BOX
Filed Aug. 7, 1941  2 Sheets-Sheet 2

Inventor:
Donald G. Fawkes
By Joseph O. Lange Atty

Patented Jan. 12, 1943

2,308,475

UNITED STATES PATENT OFFICE 2,308,475

SPRING LOADED STUFFING BOX

Donald G. Fawkes, Chicago, Ill., assignor to Crane Co., Chicago, Ill., a corporation of Illinois Application August 7, 1941, Serial No. 405,780

5 Claims. (Cl. 286—30)

My invention relates broadly to fluid sealing devices such as are used in pumps, valves, or similar apparatus wherein a shaft which rotates or reciprocates within a housing projects outwardly through an opening formed in the latter, and in which case it is desired to prevent leakage through the clearance which necessarily exists between the shaft and the bore of the housing within which it is journaled.

The necessity for frequent examination and adjustment of the stuffing boxes in many of the conventional types of valves, pumps, hydraulic cylinders and the like, is well known. This is generally attributable to the shrinking of the packing material which is especially rapid when volatile lubricants are driven out of the packing material by high temperature service; another and major cause for packing shrinkage is the normal wearing away of the material by the friction of the moving shaft or rod. This loss of packing volume allows the packing gland or compression member to move axially into the packing chamber and in the event that this compression member is loaded by means of bolts, as is generally the case, the initial bolting load would be reduced, thereby reducing the packing compression and result in leakage of fluid along the moving shaft, necessitating retightening of the bolts. In the ordinary bolt-loaded stuffing box a small displacement of the gland or compression member results in a considerable reduction of the packing load. Bolt-loaded packings are therefore generally tightened considerably more than necessary when they are adjusted in order to prolong the time interval before retightening. This is not a desirable practice for the reason that in certain applications, for example, in small low pressure cylinders where the stuffing box friction normally constitutes a major loss of the load applied to the reciprocating shaft, it is in fact possible to tighten the stuffing box bolts to such an extent that the shaft and the piston connected thereto cannot be moved with the available operating pressure. In such applications it would be desirable to limit the load that can be applied to the packing gland but this has proven impractical with bolt-loaded stuffing boxes.

Glands loaded with helical springs are well known in the art and they are an improvement over bolt-loaded types. However, in order that such springs possess the great strength and the ability to deflect a substantial amount as required by this type of service they must be formed of considerable size; although an improvement over the bolt-loaded type as already suggested, they do possess one disadvantage in that shrinkage of the packing causes the spring to lengthen and on lengthening the load exerted by the spring on the packing is lessened, thereby increasing the possibility of leakage. In order to construct a spring of the helical type in which the load remains substantially constant over a given increment of deflection, it would be necessary to make it of such extreme length and/or diameter that its commercial application would be very limited.

The ideal gland loading device should exert a predetermined force or load on the gland when the stuffing box is completely filled with packing, as for instance when initially assembled, and should continue to maintain that force as the packing volume decreases under normal operating conditions regardless of substantial movement of the gland into the stuffing box. As stated above, this ideal may be approached by using a helical spring of great length and/or diameter but of course this spring size would be impractical.

I have devised a means for applying a substantial load to a packing gland and have employed a novel combination of spring members which result in a load of predetermined magnitude being applied to the gland, this predetermined load remaining substantially constant over the normal distance of the gland's travel in following the shrinking packing into the packing chamber.

I achieve the above announced object of my invention by means of a spring combination consisting of: first, an ordinary helical spring having a positive load deflection rate, that is, its resisting load increases as it is compressed; and second, a disc spring of frusto-conical shape having a negative load deflection rate.

Stated generally, it is the object of my invention to provide loading means for a packing gland consisting of the combination of resilient means or members having opposite load deflection characteristics, whereby the packing compression will remain substantially the same at all normal positions of the packing gland.

Another object of my invention lies in the provision of a small-sized spring device which will apply a substantially uniform load to a packing gland over the entire distance of its normal travel.

Other objects and advantages of my invention will become more readily apparent as the following detailed description proceeds in connection with the accompanying drawings, in which Fig. 1 is a fragmentary sectional view of a stuffing box employing my device.

Fig. 2 is a graphical illustration of the load-deflection characteristics of the form of my device shown in Fig. 1.

Like reference characters refer to like parts.

Figures 3, 4:
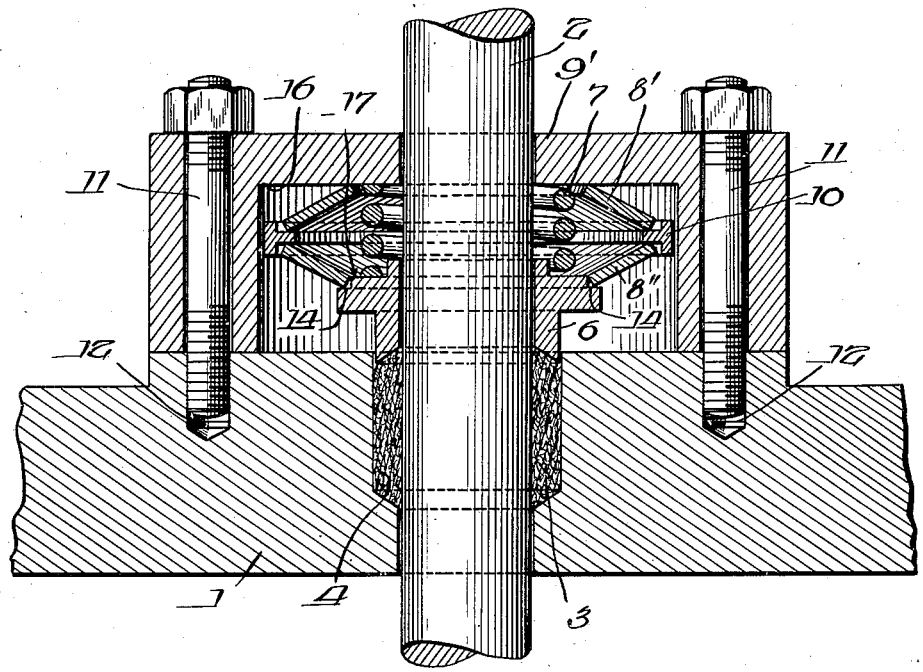
Fig. 3 is a fragmentary sectional view of a stuffing box illustrating a modification of the structure shown in Fig. 1.
Fig. 4 illustrates, in solid lines, the unloaded shape of an annular spring such as I prefer to incorporate in my invention, the shape it may assume upon being fully loaded being indicated by the broken lines.

Referring now specifically and in detail to the form of my invention as illustrated herein, the housing 1 represents a portion of a valve bonnet, a motor casing, an end plate of a hydraulic cylinder or the like, while the rod 2 may correspondingly represent a valve stem, a rotor shaft, a piston rod, or a like rotative or reciprocative shaft. The packing 3 is compressed within the packing chamber 4 by means of the packing gland or compression member 6 which is urged downwardly into the packing chamber 4 by the helical spring 7 and the frusto-conical shaped disc spring 8. The annularly shaped back-up member 9 is suitably maintained in fixed relationship with the housing 1, as for instance by means of the bolt studs 11 which are screwed into suitably drilled and tapped openings 12 in the housing. The frusto-conical spring member 8 bears at its outer extremity upon a suitably formed shoulder 13 in the back-up member 9 and at its inner periphery upon a shoulder 14 formed upon the gland 6; similarly, the helical spring 7 bears at its upper extremity upon a suitably formed shoulder 16 in the member 9 and at its lower extremity upon the shoulder 17 formed upon the gland.

The essence of my invention lies in the novel combination of the helical spring 7 and the frusto-conical spring 8 which are so associated that their opposite load-deflection characteristics are utilized to produce a uniform compression load upon the packing 3 regardless of substantial amounts of shrinkage of the packing due to normal wear and volatilization.

The graph in Fig. 2 shows a typical load-deflection curve A for an annular frusto-conical spring of the type I prefer to use and also a typical load-deflection curve B for a helical spring such as employed in Fig. 1. All annular disc springs do not have a rate which varies in the manner shown in Fig. 2; as a matter of fact, they can have load-deflection characteristics quite similar to that of a helical spring. However, the outside and inside diameter, the thickness of the material and the free height may be so selected that the rate characteristic is similar to that shown. The resultant curve C is determined by adding the values of A and B at the various deflections or compressions. The curve C therefore represents the load deflection characteristics of the spring members 7 and 8 in Fig. 1 when their loads are applied in parallel upon the gland 6, as shown. It is also possible to proportion a disc spring in such a manner that a substantially zero load-deflection rate is obtained similar to the resultant load curve C. It will be noted that a substantial portion of the curve C, namely from D to E, is almost flat; otherwise meaning, over the compression range from D to E the combination of springs 7 and 8 will exert practically the same load upon the gland 6. Thus the device may be assembled initially in such a manner that the springs 7 and 8 are compressed as at D in Fig. 2; as the packing 3 decreases in volume due to normal wear and evaporation of volatile lubricants especially at higher temperatures, the springs 7 and 8 will lose compression in forcing the gland 6 down the receding packing; as the compression of the spring members moves from D to E the load exerted by the helical spring will fall off steadily (curve B) but the load exerted by the disc spring 8 will steadily rise (curve A); however, the resultant load will remain substantially the same (curve C).

In Fig. 1 the parts are shown as they would be in the initially assembled condition before the packing 3 has lost any appreciable amount of its initial volume. Under these conditions the annular disc spring 8 will be substantially concave downward, as shown; however, before the bolt studs 11 are tightened to urge the back-up member 9 down upon the springs, or after the packing 3 has lost considerable volume, both springs will be in a condition of less compression (or none at all), the spring 7 being axially longer and the disc spring 8 assuming a less concave or in some cases even a downwardly convex shape as shown in Fig. 4, in the unloaded condition. The spring does not necessarily have to be concave downward as shown, but generally speaking, for the loads encountered in such an application and with the most desirable spring proportions, the disc will be concave downward when the gland is in its outermost position. Also, generally speaking, the negative rate begins to take effect at some deflection considerably smaller than the deflection necessary to flatten the disc, so that a workable arrangement could be devised in which the spring is concave downward at both inner and outer gland positions, and becoming less concave as the gland recedes into the stuffing box.

The various elements of my device are preferably so positioned and so dimensioned that with a completely filled stuffing box the spring deflection is of the magnitude D and with the packing gland displaced to its maximum limit into the stuffing box 4, the spring deflection is equal to E, that is, still within the flat portion of the curve C.

Other equivalent structures and modifications will be seen by one skilled in the art in the light of the disclosures herein. For instance, as shown in Fig. 3, a plurality of annular springs 8' and 8'' may be employed in series in order to provide greater resiliency and thus increase the length of the flat portion ED of curve C in Fig. 2. A spacer ring 10 is provided for the outer peripheries of the springs 8' and 8'' to bear upon. The structure shown in Fig. 3 is substantially the same as that shown in Fig. 1 except that an annular member 9' is employed instead of the member 9 in order to better accommodate the pair of annular springs 8' and 8''.

From the above description it will be apparent that I have produced a spring-loaded packing construction embodying all of the features of advantage set forth as desirable, and while I have described and illustrated one preferred embodiment, it is to be understood that I reserve the right to all changes within the spirit of the invention as defined by the appended claims.

I claim:

1. In a stuffing box construction, the combination of a housing, a shaft journaled within the said housing, an annular packing chamber interposed between the said housing and the said shaft, packing within the said chamber, a gland or compression member surrounding the said shaft and adapted to be moved axially upon the said packing, a fixed member positioned beyond the said gland, resilient members having substantially equal and opposite load-deflection characteristics compressed independently between the said fixed member and the said gland, whereby upon downward movement of the said gland into the said packing chamber under the influence of said compressed resilient members the load or force exerted by one of the said resilient members increases and the load exerted by another decreases, whereby further a substantially constant compressive load is maintained on the said packing.

2. A stuffing box comprising, in combination, a casing, a rod journaled within a wall of the said casing, packing positioned around the said rod within the said casing wall, a gland surrounding the said rod and adapted to be pressed upon the said packing, a fixed member positioned outside of the said gland, independent resilient members bearing respectively against the said gland and the said fixed member, said resilient members having equal and opposite load-deflection characteristics of such degree that upon movement of the said gland with relation to the said packing the load exerted by a portion of the said resilient members upon the said gland increases and the load exerted by the other of the resilient members decreases in substantially the same proportion, whereby approximately the same resultant compressive load is maintained upon the said packing throughout the entire normal axial travel of the said gland.

3. A stuffing box comprising, in combination, a housing containing respectively a packing chamber, packing and a gland, the said gland being resiliently urged into the said packing chamber upon the said packing by resilient means, the latter comprising respectively a helical spring and an annular disc spring, the said springs having substantially equal and opposite load deflection characteristics, both of the said springs being normally independently compressed between a fixed outside member and the said gland, the annular disc spring being adapted to exert increased load upon the said gland as movement of the latter causes the helical spring to exert a decreased load, whereby a substantially uniform resultant load is applied to the said gland by the said resilient means irrespective of substantial axial movement of the said gland with respect to the said packing.

4. In a stuffing box, a housing, packing chamber, packing, and gland, said gland being loaded by resilient means, said resilient means comprising at least one helical spring and at least one frusto-conical shaped spring, the said springs adapted to bear independently upon the said gland and urge the latter member into the said packing chamber, the load-deflection characteristics of the said springs being so related to one another that increase of load in the helical spring or springs is accompanied by a decrease of load in the frusto-conical spring or springs and vice versa, whereby the force resulting from the said spring combination tending to urge the said gland into the said packing chamber is substantially the same at all normal axial positions of said gland.

5. A stuffing box comprising the combination of a casing, a shaft journaled within a wall of said casing, an annular packing chamber interposed between said shaft and said casing wall, an annular gland surrounding said shaft and axially movable with respect thereto, a plurality of independently mounted resilient members adapted to press said gland upon the packing in the said packing chamber, the said resilient members having equal and opposite load-deflection characteristics of such value that upon axial movement of the said gland the load exerted by part of the said resilient members increases and the load exerted by the other part decreases, whereby the total resultant load or force exerted upon said gland by said resilient members is substantially the same for all normal axial positions of the said gland both with relation to the said shaft and to the said casing.

DONALD G. FAWKES.